United States Patent
McFall (10) Patent No.: US 11,231,060 B2
(45) Date of Patent: Jan. 25, 2022

(54) HYBRID TENSION/TRANSVERSE COMPRESSION STRUCTURAL JOINT

(71) Applicant: Bruce Daniel McFall, Grandview Heights, OH (US)

(72) Inventor: Bruce Daniel McFall, Grandview Heights, OH (US)

( * ) Notice: Subject to any disclaimer, the term of this patent is extended or adjusted under 35 U.S.C. 154(b) by 247 days.

(21) Appl. No.: 16/249,460

(22) Filed: Jan. 16, 2019

(65) Prior Publication Data
US 2020/0224691 A1    Jul. 16, 2020

(51) Int. Cl.
*F16B 11/00* (2006.01)
*F16B 7/04* (2006.01)
(Continued)

(52) U.S. Cl.
CPC .......... *F16B 11/008* (2013.01); *F16B 5/0004* (2013.01); *F16B 5/08* (2013.01);
(Continued)

(58) Field of Classification Search
CPC ...... F16B 7/0406; F16B 7/0413; F16B 7/042; F16B 7/18; F16B 7/182; F16B 7/185; F16B 11/006; F16B 11/008; F16B 2/04; F16B 2/14; Y10T 403/342; Y10T 403/345; Y10T 403/347; Y10T 403/349; Y10T 403/47; Y10T 403/471; Y10T 403/472; Y10T 403/473; Y10T 403/475; Y10T 403/55; Y10T 403/551; Y10T 403/555; Y10T 403/557; Y10T 403/5793; Y10T 403/7064; Y10T 403/7066; Y10T 403/7067; Y10T 403/7069; Y10T 403/76; E04H 2001/2415; E04H 2001/2421; E04H 2001/2457; E04H 2001/2448; E04C 5/165; E04B 2001/2415; E04B 2001/2421; E04B 2001/2457; E04B 2001/2448
See application file for complete search history.

(56) References Cited

U.S. PATENT DOCUMENTS

| | | | | |
|---|---|---|---|---|
| 958,316 | A | * | 5/1910 | Rogers et al. .......... E06B 3/982 403/402 |
| 2,326,941 | A | * | 8/1943 | Heitner ................. F16B 7/0413 403/286 |

(Continued)

OTHER PUBLICATIONS

Groves et al, Evaluation of Cylindrical Shear Joints for Composite Materials, Journal of Composite Materials, vol. 26 (8), pp. 1134-1150, Sage Publications, 1992.

*Primary Examiner* — Amber R Anderson
*Assistant Examiner* — Kevin J Baynes
(74) *Attorney, Agent, or Firm* — Burris Law, PLLC (57) ABSTRACT

A structural joint includes a first compression element and a second compression element. The first and second compression elements each define an exterior profile geometry tailored to accommodate a set of loading conditions. A first structural member with a distal end portion is disposed adjacent the first compression element and a first gap is defined therebetween, and a second structural member with a distal end portion is disposed adjacent the second compression element and a second gap is defined therebetween. A first adhesive fills the first gap and a second adhesive fills the second gap. A joint cover body extends over the distal end portions of the first and second structural members.

21 Claims, 10 Drawing Sheets

(51) Int. Cl.
*F16B 5/00* (2006.01)
*F16B 5/08* (2006.01)

(52) U.S. Cl.
CPC .............. *F16B 7/042* (2013.01); *F16B 7/048* (2013.01); *Y10T 403/471* (2015.01); *Y10T 403/472* (2015.01); *Y10T 403/473* (2015.01); *Y10T 403/55* (2015.01)

(56) References Cited

U.S. PATENT DOCUMENTS

| | | | | |
|---|---|---|---|---|
| 3,692,336 | A | * | 9/1972 | Zon .................... F16L 37/0925 285/148.19 |
| 3,901,613 | A | * | 8/1975 | Andersson ............ F16B 7/0446 403/178 |
| 4,144,660 | A | * | 3/1979 | Lamb .................... B44D 3/185 160/378 |
| 4,179,830 | A | * | 12/1979 | Lamb .................... B44D 3/185 160/378 |
| 4,270,872 | A | * | 6/1981 | Kiyosawa ............. F16B 7/0446 403/170 |
| 4,373,235 | A | * | 2/1983 | Korgaonkar ............ F16L 23/04 24/282 |
| 4,385,644 | A | | 5/1983 | Kaempen |
| 4,469,730 | A | | 9/1984 | Burhans |
| 4,755,406 | A | | 7/1988 | Fuchs |
| 4,776,721 | A | * | 10/1988 | Lange .................. E04B 1/1903 403/171 |
| 4,997,155 | A | * | 3/1991 | Reuter ............... F16M 11/2014 248/278.1 |
| 5,076,165 | A | * | 12/1991 | Pollich .................... B41F 21/05 101/409 |
| 5,082,314 | A | | 1/1992 | Aubry et al. |
| 5,163,367 | A | * | 11/1992 | Newman ................ B41F 15/36 101/127.1 |
| 5,318,374 | A | | 6/1994 | Rumberger |
| 5,806,919 | A | | 9/1998 | Davies |
| 6,022,054 | A | * | 2/2000 | Hemphill ............. B29C 65/5042 285/398 |
| 6,270,600 | B1 | * | 8/2001 | Wycech .................. B29C 44/12 156/79 |
| 6,276,866 | B1 | | 8/2001 | Rutan |
| 6,289,636 | B1 | * | 9/2001 | White ..................... F16B 7/025 248/544 |
| 6,832,918 | B2 | | 11/2004 | Grosskrueger et al. |
| 6,910,361 | B2 | * | 6/2005 | Childs .................... F16B 7/042 403/297 |
| 7,284,481 | B2 | * | 10/2007 | Kasuya .................. B41F 15/36 101/127.1 |
| 7,303,374 | B2 | | 12/2007 | Li et al. |
| 7,574,835 | B2 | | 8/2009 | Bohlmann |
| 7,611,595 | B2 | | 11/2009 | Barnes |
| 7,678,437 | B2 | | 3/2010 | Escobar Benavides et al. |
| 8,205,315 | B2 | | 6/2012 | Mullen et al. |
| 8,262,825 | B2 | | 9/2012 | Fahey et al. |
| 8,291,671 | B2 | | 10/2012 | Vera Villares et al. |
| 8,959,747 | B2 | * | 2/2015 | Calhoun .................. E04C 3/40 29/525.01 |
| 2008/0115454 | A1 | | 5/2008 | Xie |
| 2008/0131630 | A1 | | 6/2008 | Schnelz |
| 2009/0084899 | A1 | | 4/2009 | Kismarton et al. |
| 2010/0008715 | A1 | * | 1/2010 | Minowa .................. F16B 7/042 403/203 |
| 2010/0074678 | A1 | | 3/2010 | Jaranson et al. |
| 2010/0140980 | A1 | | 6/2010 | Stanton |
| 2010/0230042 | A1 | | 9/2010 | Frisch et al. |
| 2011/0095129 | A1 | | 4/2011 | Villares et al. |
| 2011/0186211 | A1 | | 8/2011 | Fahey et al. |
| 2012/0060636 | A1 | | 3/2012 | Dewhirst |
| 2012/0090265 | A1 | | 4/2012 | McCarville et al. |
| 2012/0118531 | A1 | | 5/2012 | Lukowski, Jr. |
| 2012/0128408 | A1 | | 5/2012 | Hand et al. |
| 2012/0183347 | A1 | | 7/2012 | Wanthal |
| 2012/0286091 | A1 | | 11/2012 | Kajita et al. |
| 2018/0274576 | A1 | * | 9/2018 | Sutter ................... F16B 11/006 |
| 2019/0061834 | A1 | * | 2/2019 | Sangha .................. B29C 65/48 |
| 2019/0352905 | A1 | * | 11/2019 | Desheng ............... E04C 5/165 |

\* cited by examiner

HYBRID TENSION/TRANSVERSE COMPRESSION STRUCTURAL JOINT

FIELD

The present disclosure relates to structural joints, and more particularly to structural joints for joining composite structures.

BACKGROUND

The statements in this section merely provide background information related to the present disclosure and may not constitute prior art.

Joining of composite structural members can be difficult due to the fibrous and laminated nature of composite materials. For example, structural members formed from composite material forms such as woven carbon fiber prepregs, unidirectional fiber prepregs, and woven preforms for subsequent molding operations, among others, are difficult to mechanically join to other members while maintaining an efficient load path. More specifically, drilling holes through composite structures disrupts load paths by breaking or fracturing continuous fibers, resulting in a degradation of mechanical properties and increasing thickness of the composite structure, thus adding weight and inhibiting the inherent weight savings provided by composite materials. Further, adjacent structure attached to a composite structural member may apply forces in directions for which the member was not designed (e.g., interlaminar tension), thus reducing the structural efficiency of the structural joint.

These issues of joining composite structural members, among other issues related to the use of composite materials in structural joints, is addressed by the present disclosure.

SUMMARY

In one form of the present disclosure, a structural joint includes a first compression element defining an exterior profile geometry tailored to accommodate a set of loading conditions, a first structural member with a distal end portion disposed adjacent the first compression element and defining a gap therebetween, and a first adhesive material covering the external profile geometry of the first compression element and filling the gap between the first structural member and the first compression element. The structural joint also includes a second compression element defining an exterior profile geometry tailored to accommodate the set of loading conditions, a second structural member with a distal end portion disposed adjacent the second compression element and defining a gap therebetween, and a second adhesive material covering the external profile geometry of the second compression element and filling the gap between the second structural member and the second compression element.

A joint cover body extends over the distal end portions of the first and second structural members. In some aspects of the present disclosure, the joint cover body defines an internal cavity adapted to receive extensions on outer portions of the first and second central compression caps and at least one removable band extends around the joint cover body. Laterally opposed internal pockets with a profile geometry tailored to accommodate the set of loading conditions are defined between the joint cover body and the distal end portions of the first and second structural members. Also, a tertiary adhesive is disposed within the laterally opposed internal pockets of the joint cover body. In some aspects of the present disclosure, at least one of the first, second, and tertiary adhesive materials is a thermoset epoxy type adhesive. The first, second, and tertiary adhesive materials may or may not be the same material.

In other forms of the present disclosure, at least one of the first structural member and the second structural member are hollow. In these forms, at least one of the first structural member and the second structural member define a closed geometry. Also, at least one of the first structural member and the second structural member may define at least one internal stiffener.

In yet another form of the present disclosure, the structural joint includes a locking system. The locking system includes a first central compression cap disposed adjacent a distal end portion of the first compression element and secured to an interior portion of the joint cover body. A second central compression cap is disposed adjacent a distal end portion the second compression element and secured to another interior portion of the joint cover body. A first securing device is included and adapted to secure the first compression element to the first central compression cap and a second securing device is included and adapted to secure the second compression element to the second central compression cap such that the locking system is configured to hold the first and second compression units under compressive loads.

In another form of the present disclosure, the first and second securing devices are elongated bolts with a head at a proximal end portion and threads at a distal end portion. In this form, a nut is secured to the threads of the elongated bolts and the first and second central compression caps each define a recessed portion adapted to receive the nuts. Also, each of the heads of the first and second elongated bolts abut proximal end portions of each of the first and second compression elements.

In one form, normal compressive forces from the structural joint under loads are equalized across each of the adhesive materials. At least one of the first structural member and the second structural member may define a composite material and the joint cover body defines a tapered outer profile that extends inwardly from a central portion of the structural joint distally. The tapered outer profile may define a two-dimensional taper and/or may define a three-dimensional B-surface. Also, the laterally opposed internal pockets of the joint cover body may be tapered inwardly from a center portion thereof outwardly.

In another form of the present disclosure, the gap between the first structural member and the first compression element is wider at the distal end portion of the first structural member and tapers inwardly towards a proximal end portion of the first structural member. In the alternative, or in addition to, the gap between the second structural member and the second compression element is wider at the distal end portion of the second structural member and tapers inwardly towards a proximal end portion of the second structural member.

In yet another form, the exterior profile geometry of the first compression element and the second compression element taper inwardly toward the distal end portions of the first structural element and the second structural element, respectively. Also, at least one of the first compression element and the second compression element define internal longitudinal cutouts and/or the first compression element is symmetrical with the second compression element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
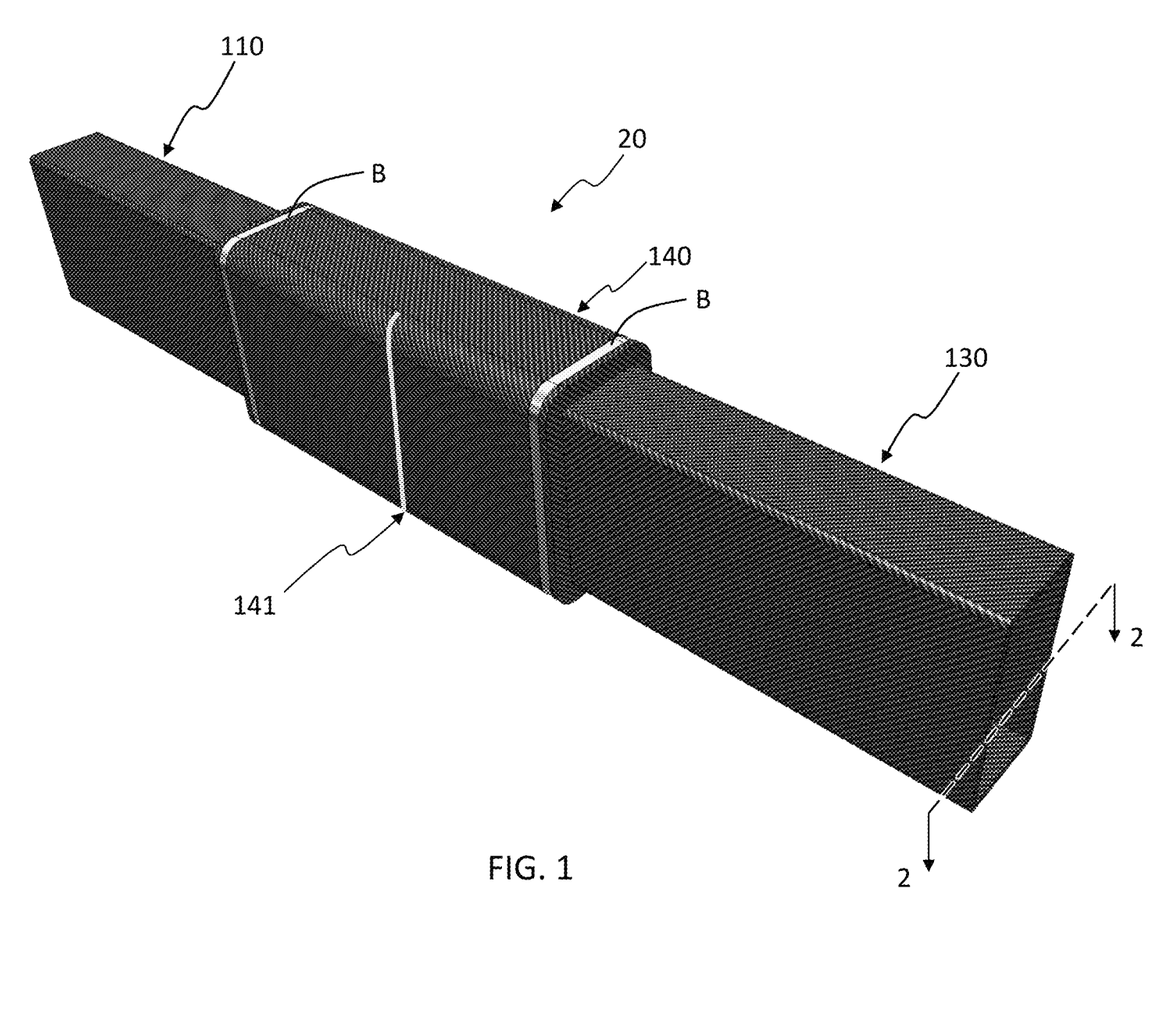
FIG. 1 is a perspective view of a structural joint according to the teachings of the present disclosure.

Referring to FIG. 1, a hybrid tension/transverse compression joint (hereafter referred to simply as a "structural joint") is illustrated and generally referred to as reference numeral 20. The structural joint 20 includes a first structural member 110, a second structural member 130, and joint cover body 140 that covers various components of the structural joint 20 as described in detail below. In one form of the present disclosure, the joint cover body 140 is formed from at least two parts (not shown). For example, the joint cover body 140 is formed from two halves (not shown) and at least one removable band 'B' secures the two halves together. In another form, the joint cover body 140 may be molded over the first structural member 110, the second structural member 130, and the various components of the structural joint 20, resulting in a more permanent assembly. For example, the joint cover body 140 may be compression molded over the joint components with a high speed carbon fiber molding compound, such as by way of example, HexMC® brand molding compound. In yet another variation, the molded joint cover body 140 may include bosses or recesses 141 on an exterior portion to provide a location to align a cutting tool to remove the molded joint cover body 140. Furthermore, the joint cover body 140 may define a specific geometry to achieve increased strength (e.g., bending stiffness, torsional stiffness) along the structural joint 20, a specific profile for different applications (e.g., angled/tapered), among other functions. These and other variations of the joint cover body 140 shall be construed as falling within the scope of the present disclosure.

Figure 2:
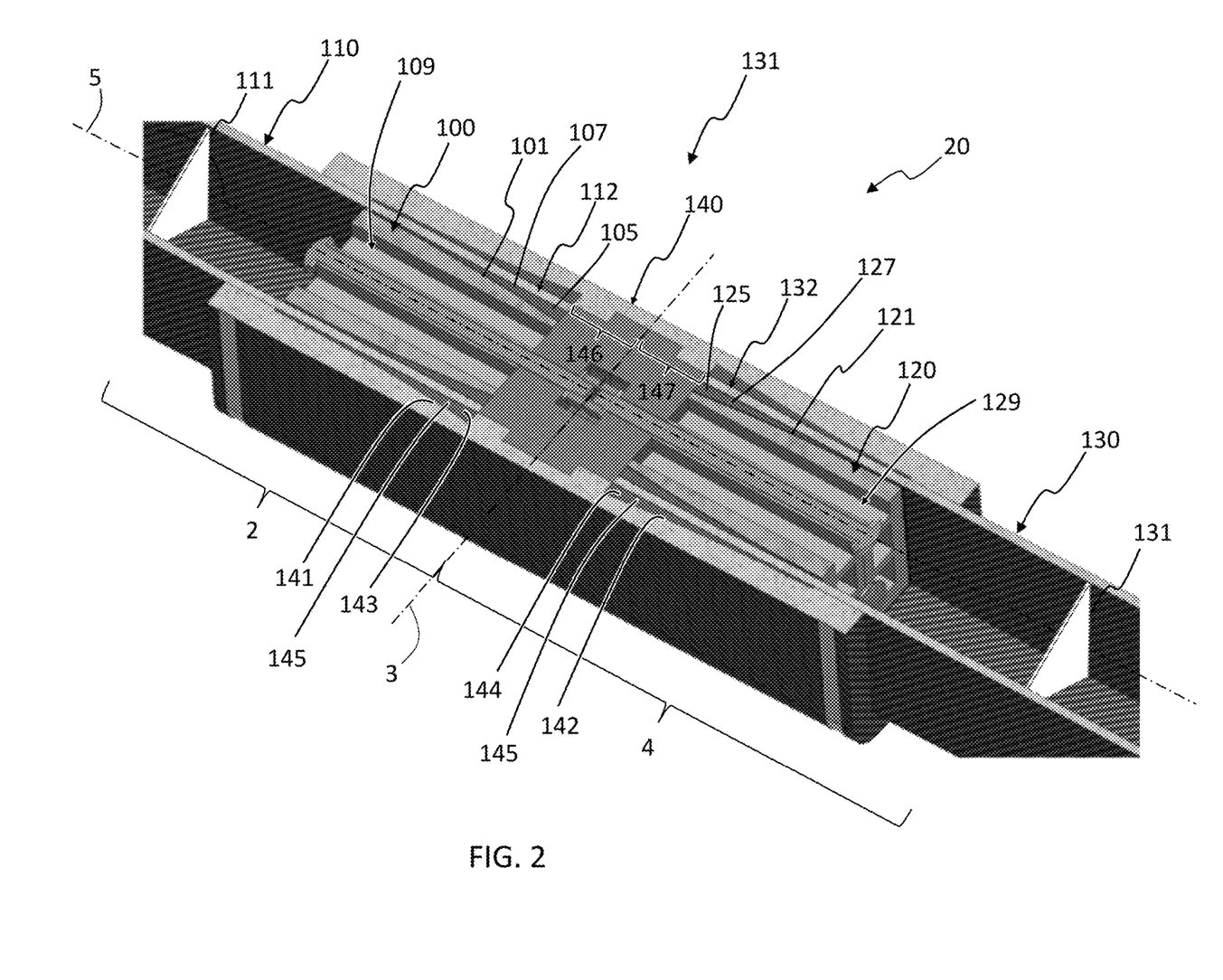
FIG. 2 is a perspective cross-sectional view of the structural joint taken along line 2-2 of FIG. 1.

Referring now to FIG. 2, interior portions of the structural joint 20 are illustrated in greater detail. The first structural member 110 is positioned on a first side 2 of a transverse joint axis 3 and the second structural member 130 is positioned on a second side 4 of the transverse joint axis 3. The structural joint 20 includes a first compression element 100 on the first side 2 and the first structural member 110 has a distal end portion 112 disposed adjacent the first compression element 100. As used herein, the phrase "distal end" refers to an end or portion of a component that is positioned adjacent or proximate to the transverse joint axis 3 as opposed to a "proximal end" or "proximal portion" of the component that is spaced apart from the transverse joint axis 3. That is, a distal end or distal portion of a component is positioned closer to the transverse joint axis 3 than a proximal end or proximal portion of the component.

In one form of the present disclosure, the first structural member 110 defines at least one internal stiffener 111 and/or the second structural member 130 defines at least one internal stiffener 131. While the internal stiffeners 111 and 131 are schematically depicted in FIG. 2 extending laterally (z-direction), it should be understood that internal stiffeners with other orientations, shapes, sizes, etc., are included within the teachings of the present disclosure. It should also be understood that an internal stiffener provides additional longitudinal (x-direction) and/or transverse (z-direction) strength and/or stiffness to the respective structural member.

The first compression element 100 defines an exterior profile geometry 101 such that a first gap 105 is defined between the distal end portion 112 of the first structural member 110 and the first compression element 100. As used herein, the term "exterior" refers to a profile, surface, etc., facing away from a longitudinal axis 5 of the structural joint 20 as opposed to an interior profile, interior surface, etc., facing towards the longitudinal axis 5 of the structural joint 20. A first adhesive material 107 covers the external profile geometry 101 of the first compression element 100 and fills the first gap 105 between the distal end portion 112 of the first structural member 100 and the first compression element 100. It should be understood that the exterior profile geometry 101, and other exterior profile geometries described herein, are shaped or tailored to accommodate a set of loading conditions. That is, depending on the structure of the first and second structural members 110, 130 and/or the overall structure and use of a component employing the structural joint 20, the depth (z-direction), length (x-direction), curvature, etc., of the external profile geometry 101 can be modified to provide a desired strength to the structural joint 20.

In one form, the first compression member 110 and/or a second compression member 120 define internal longitudinal cutouts. For example, the first compression member 110 defines at least one longitudinal cutout 109 and the second compression member 120 defines at least one longitudinal cutout 129. In the illustrated form, each of the compression members 110/120 defines four cutouts, which are primarily for weight savings purposes.

Still referring to FIG. 2, the structural joint 20 includes the second compression element 120 on the second side 4, and the second structural member 130 has a distal end portion 132 disposed adjacent the second compression element 120. The second compression element 120 defines an exterior profile geometry 121 such that a second gap 125 is defined between the distal end portion 132 of the second structural member 130 and the second compression element 120. Also, a second adhesive material 127 covers the external profile geometry 121 of the second compression element 120 and fills the second gap 125 between the distal end portion 132 of the second structural member 120 and the second compression element 120. The first adhesive material 107 may be the same or different from the second adhesive material 127.

While the first compression element 100 and the second compression element 120 provide the first gap 105 and the second gap 125, respectively, inside the first structural member 110 and the second structural member 130, respectively, the joint cover body 140 provides laterally opposed internal pockets outside the first and second structural members 110, 130. Particularly, the joint cover body 140 defines a first interior geometry profile 141 such that a first internal pocket 143 is defined between the distal end portion 112 of the first structural member 110 and the joint cover body 140. Also, the joint cover body 140 defines a second interior geometry profile 142 such that a second internal pocket 144 is defined between the distal end portion 132 of the second structural member 130 and the joint cover body 140. A tertiary adhesive 145 is disposed within the laterally opposed internal pockets 143, 144.

Figure 3:
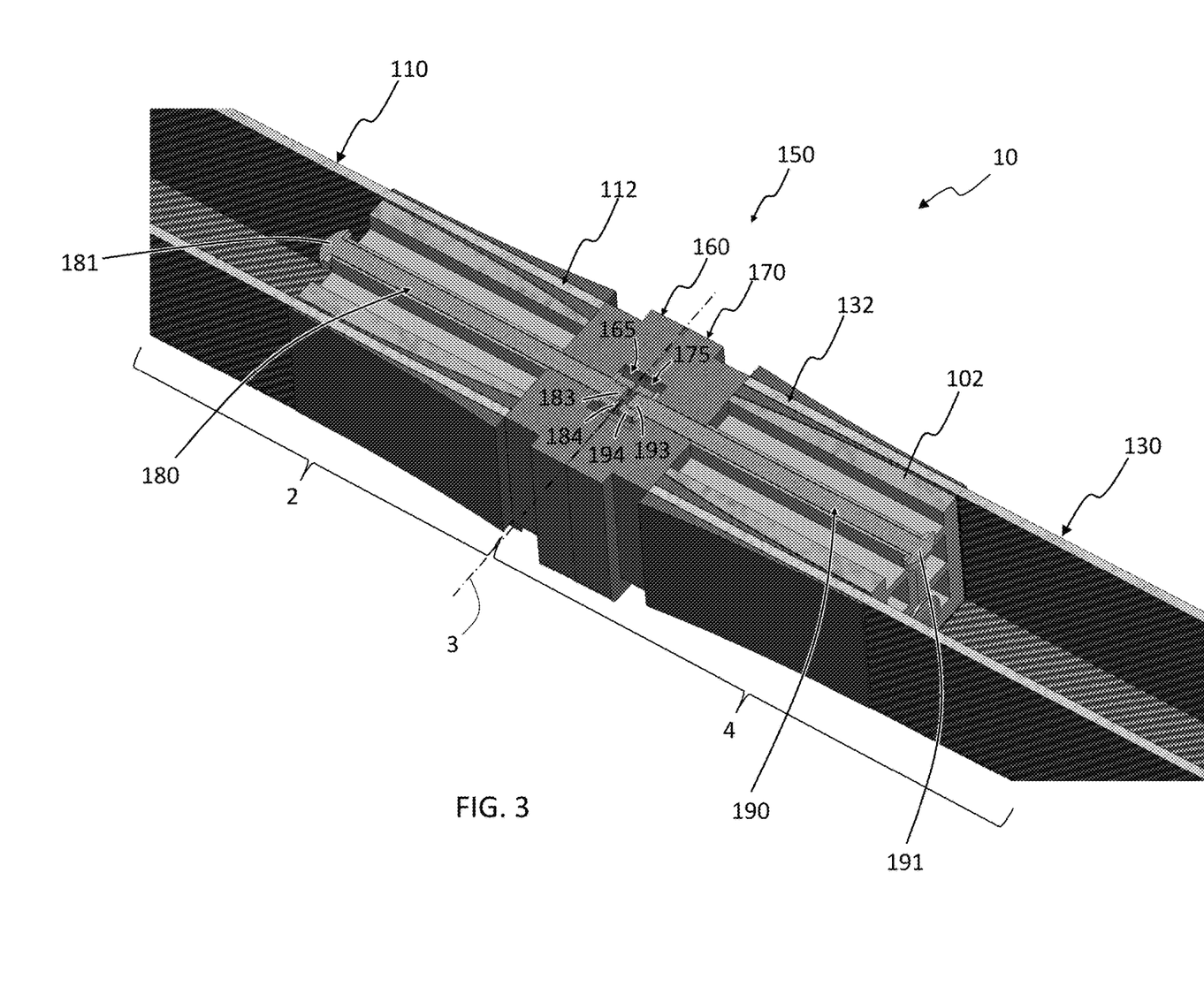
FIG. 3 is the perspective cross-sectional view in FIG. 2 without a joint cover body.
Figure 4:
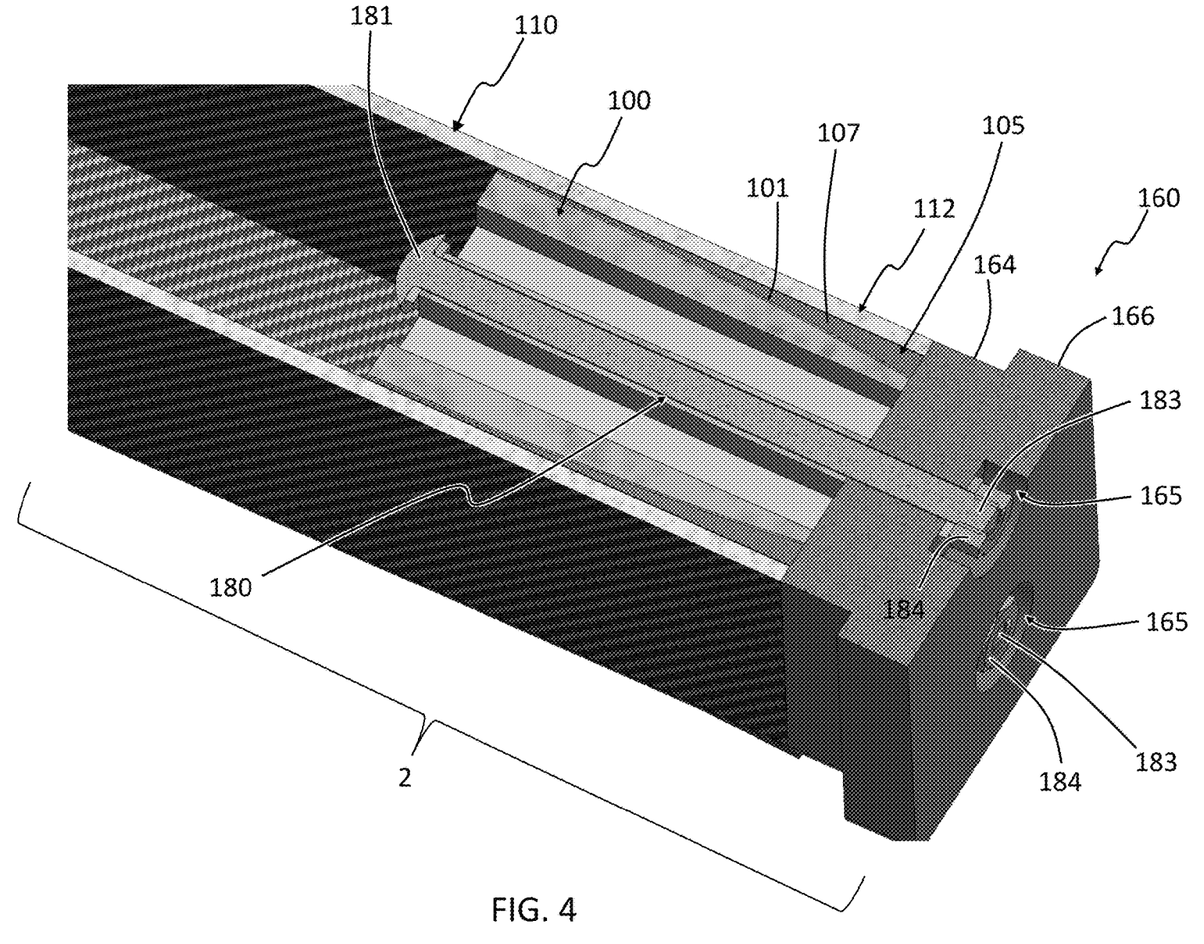
FIG. 4 is a perspective cross-sectional view of a portion of the structural joint of FIG. 3.

Referring to FIGS. 3 and 4, in one variation of the present disclosure, the structural joint 20 includes a locking system 150. Particularly, FIG. 3 depicts the structural joint 20 without the joint cover body 140 and FIG. 4 depicts only the first side 2 of the structural joint 20 without the joint cover body 140. The locking system 150 includes a first central compression cap 160 on the first side 2 of the structural joint 20 and disposed adjacent the distal end portion 112 of the first structural member 110, and a second central compression cap 170 on the second side 4 of the structural joint 20 and disposed adjacent the distal end portion 132 of the second structural member 130. The first central compression cap 160 is secured to a first interior portion 146 of the joint cover body 140 (FIG. 2) and the second central compression cap 170 is secured to a second interior portion 147 of the joint cover body 140 (FIG. 2). As further shown, a first securing device 180, e.g., a first elongated bolt 180 with a head 181 at a proximal end portion and threads 183 at a distal end portion, is adapted to secure the first compression element 100 to the first central compression cap 160. Similarly, a second securing device 190, e.g., a second elongated bolt 190 with a head 191 at a proximal end portion and threads 193 at a distal end portion, is adapted to secure the second compression element 120 to the second central compression cap 170. In one form, a first and second nut 184, 194 can be included and used to threadingly engage the first and second elongated bolts 182, 192, respectively, to secure the first and second compression elements 100, 120 to the first and second central compression caps 160, 170, respectively. In this form, the first and second central compression caps 160, 170 may further include a recessed portion 165, 175, respectively (FIG. 3), to receive the nuts 184, 194, respectively.

Referring specifically to FIG. 4, in one form, the first central compression cap 160 comprises an extension 166 extending from a base 164 longitudinally (x-direction) and transversely (z-direction). In this form, as shown best in FIG. 2, the first interior portion 146 of the joint cover body 140 is adapted to receive the extension 166 of the first central compression cap 160. Similarly, the second central compression cap 170 also comprises an extension extending from a base, and the second interior portion 147 of the joint cover body 140 is adapted to receive the extension of the second central compression cap 170.

Figure 5:
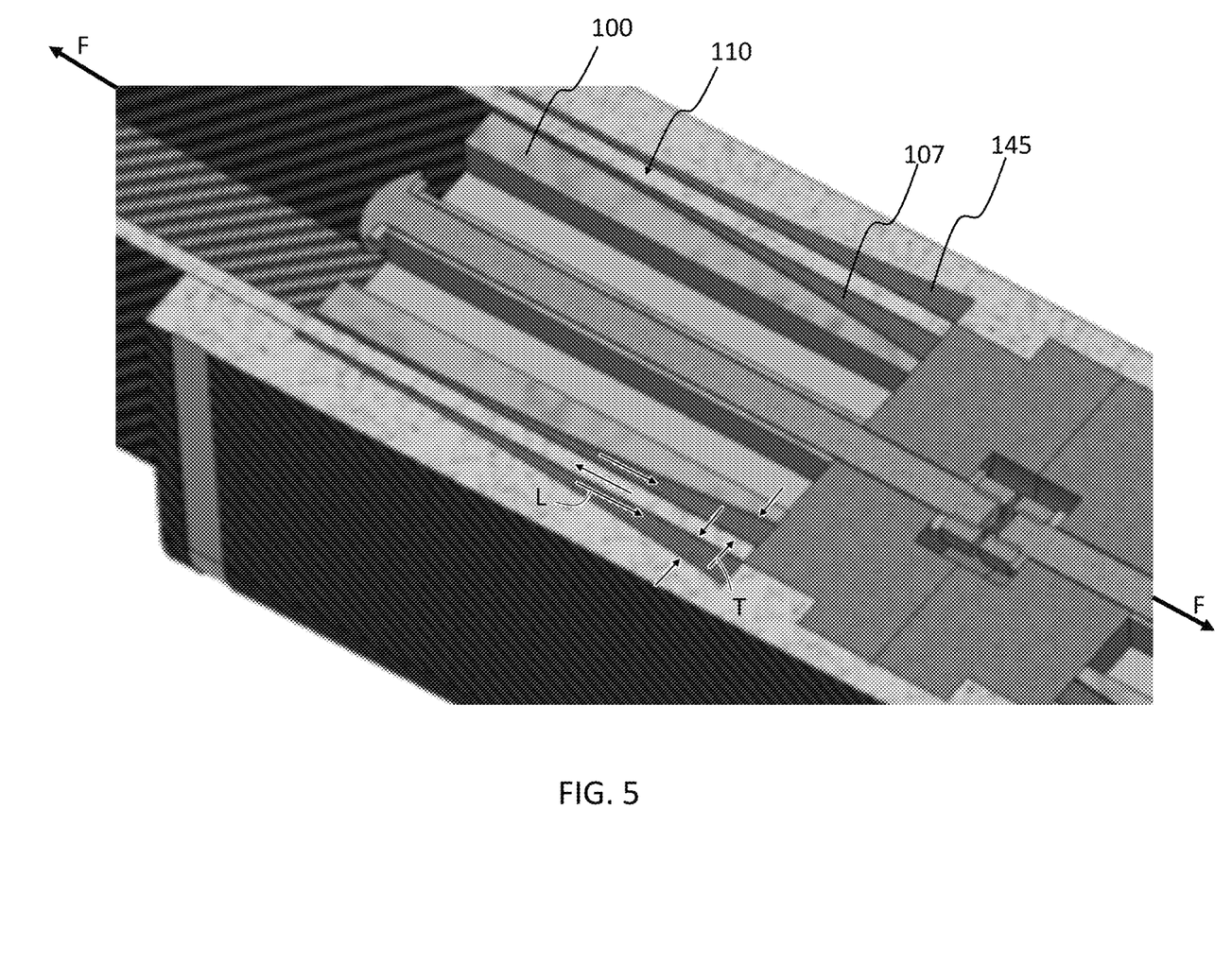
FIG. 5 is an enlarged perspective cross-sectional view of a first side of the structural joint of FIG. 2.
Figure 6A:
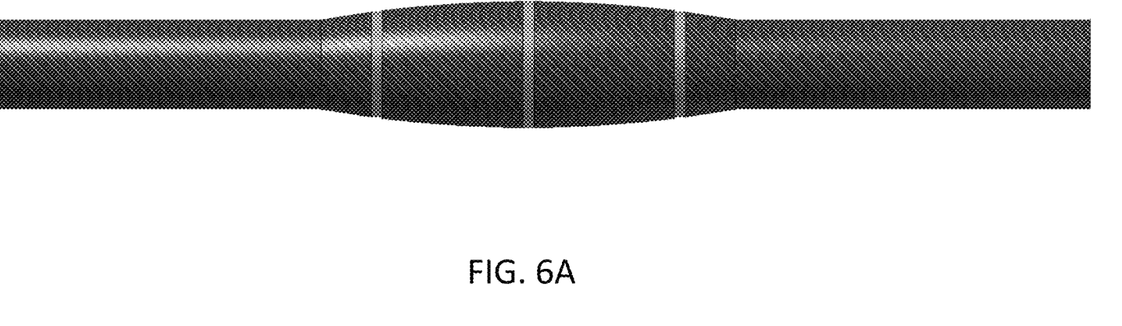
FIG. 6A is a side view of an alternate form of a structural joint having a tubular configuration and constructed according to the teachings of the present disclosure.
Figure 6B:
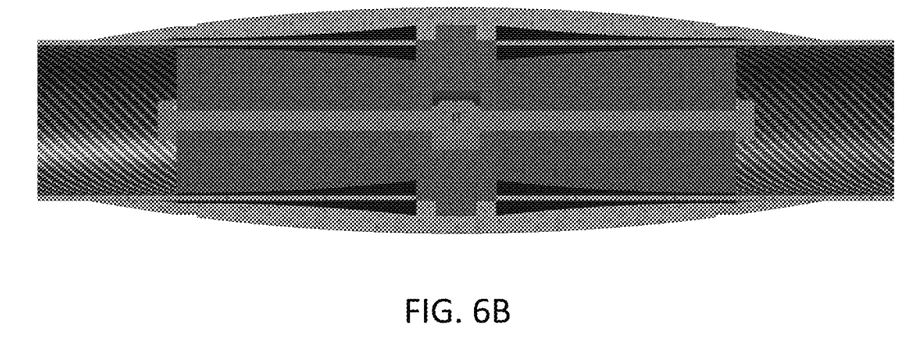
FIG. 6B is a cross-sectional view of the structural joint of FIG. 6A.
Figure 7:
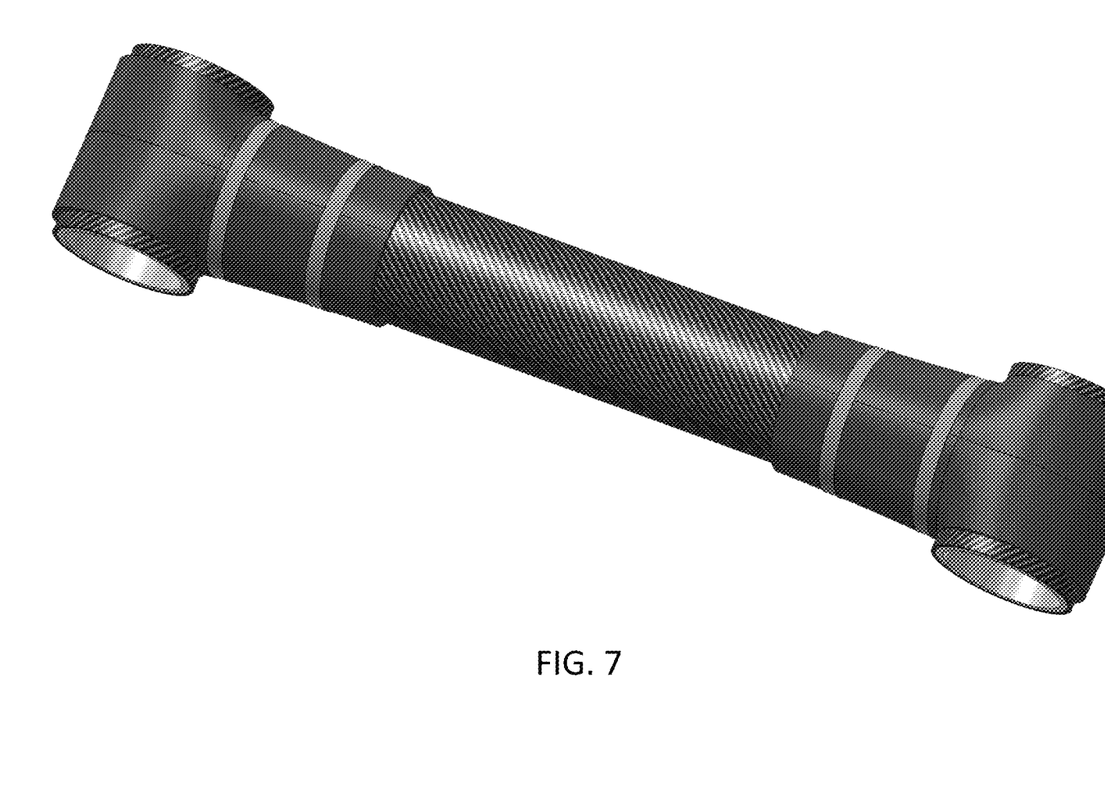
FIG. 7 is a perspective view of one form of a structural joint according to the teaching of the present disclosure in a mechanical linkage application.
Figure 8A:
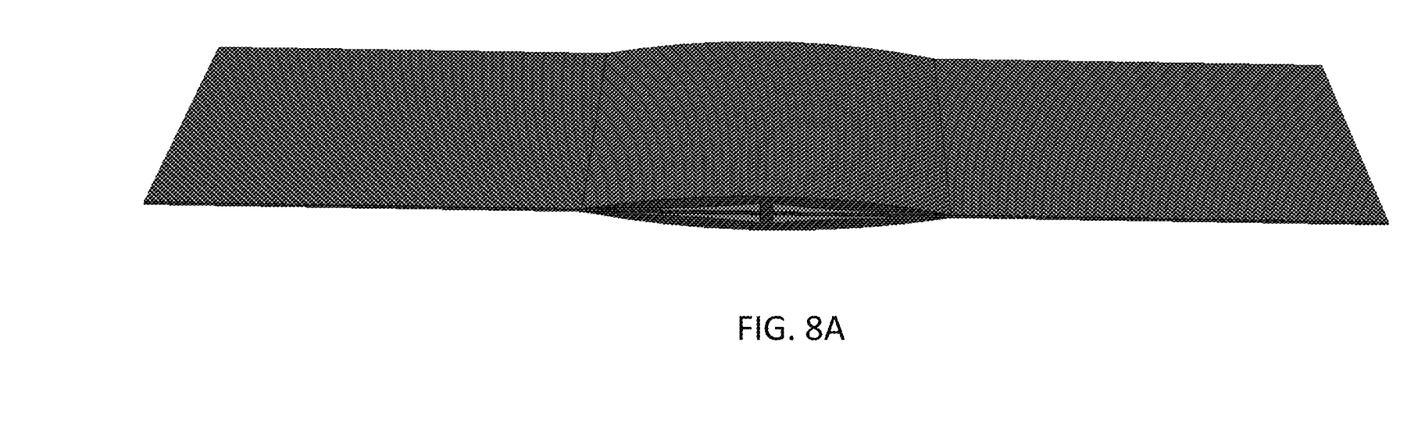
FIG. 8A is a perspective view of an alternate form of a structural joint having a flat panel configuration and constructed according to the teachings of the present disclosure.
Figure 8B:
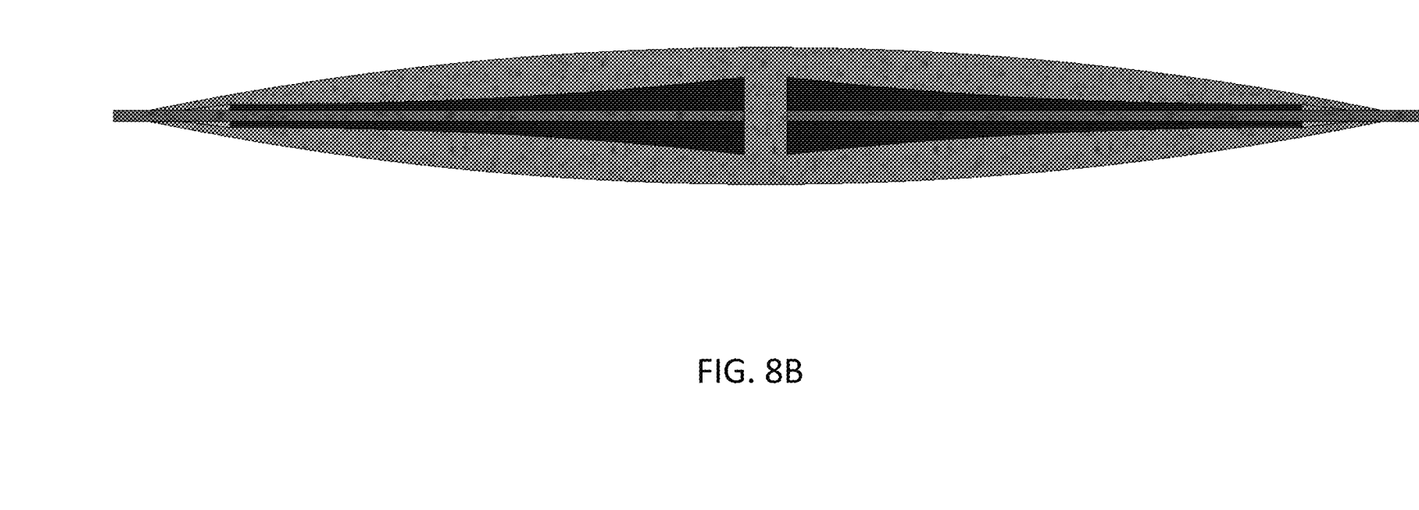
FIG. 8B is a cross-sectional view of the structural joint of FIG. 8A.

Referring now to FIG. 5, in operation or use, the structural joint 20 joins the first and second structural members 110, 120 together with desired tensile and transverse compressive strengths. Particularly, a longitudinal (x-direction) tensile load 'F' on the first and second structural members 110, 120 results in opposing longitudinal forces between the first structural member 110 and the first adhesive 107 and the tertiary adhesive 145 as shown by the arrows "L." It should be understood that similar opposing forces are between the second structural member 130 and the second adhesive 127 and tertiary adhesive 145 (not shown). Also, the opposing forces apply a compressive force on the first adhesive 107, second adhesive 127 (not shown), and tertiary adhesive 145 as shown by arrows "T" in FIG. 5. The compressive forces on the first, second, and tertiary adhesives 107, 127, 145 further strengthens their adhesion to the first and second structural members 110, 130 and thereby increases the strength of the structural joint 20. That is, a load force 'F' is translated into a compression force 'T' normal to a plane of the adhesives 107, 127, 145, thereby increasing the overall strength of the structural joint 20.

In one form of the present disclosure, the first and second sides 2, 4 of the structural joint 20 are pre-assembled before placing the joint cover body 140 over and engaging the first and second sides 2, 4 to form the structural joint 20. That is, the first side 2 of the structural joint 20 is assembled separately from the second side 4 of the structural joint 20. The first and second sides 2, 4 are aligned with each other and joined together by placing the joint cover body 140 with the first and second interior portions 142, 144 over the extensions 166, 176 of the first and second central compression caps 160, 170. It should be understood that the structural joint 20 can also be non-destructively disassembled by removing the joint cover body 140 from the first and second sides 2, 4.

The first and second compression elements 100, 120, first and second structural members 110, 130, first and second central compression caps 160, 170, and first and second securing devices 180, 190 can be formed from known materials such as metallic materials, polymer materials, composite materials, and the like. Non-limiting examples of metallic materials include steels, stainless steels, nickel-base alloys, cobalt-base alloys, and the like. Non-limiting examples of polymer materials include \nylon, low-density polyethylene (LDPE), high-density polyethylene (HDPE), polypropylene (PP), polyvinyl chloride (PVC), and the like. Non-limiting examples of composite materials include fiber reinforced polymers, ceramic matrix composites, metal matrix composites, and the like. The structural joint 20 is well suited for first and second structural members 110, 130 formed from composite materials due to the non-destructive assembly and disassembly of the structural joint 20. The first, second and third adhesives 107, 127, 145 may be formed from known adhesive materials, fillers, additives, and the like. Non-limiting examples of adhesives include are contained in the category of structural adhesives that can carry significant stresses. The key characteristic of an adhesive that results in acceptable joint performance is its response to transverse compressive stress.

It should be understood from the teachings of the present disclosure that hybrid tension/transverse compression joints between two structural members are provided. The structural members can include basic closed geometric profiles, e.g., structural members with a cross section in the shape of a circle, ellipse, square, rectangle, etc. The joint provides an external profile attachment and an internal profile attachment, thereby increasing the strength and bending stiffness of the joint. Also, the joint includes compression elements (e.g., first and second compression elements 100, 120) in the form of open shapes (e.g., extruded open shapes) that mitigate compression loads generated from joining effects as well as mitigation of stress concentrations generated by geometric discontinuity of the joint. The internal compression elements are functionally graded such that the stiffness and flexibility of the joint can be varied to account for desired bending conditions. Preloading of the joints by a connection system (e.g., first and second central compression caps 160, 170 and first and second securing devices 180, 190) can be included. It should also be understood that premade connection members (e.g., sides 2 and 4 of the structural joint 20 before the joint cover body 140 is positioned thereon) allow for complex structures to be fabricated using basic connection schemes.

Unless otherwise expressly indicated herein, all numerical values and directional terms indicating dimensions and/or tolerances, or other characteristics are to be understood as modified by the word "about" or "generally" in describing the scope of the present disclosure. This modification is desired for various reasons including industrial practice, manufacturing technology, and testing capability.

It should be noted that the disclosure is not limited to the embodiment described and illustrated as examples. A large variety of modifications have been described and more are part of the knowledge of the person skilled in the art. For example, although a rectangular configuration for the structural joint 20 has been shown, the teachings of the present disclosure may be applied to tubular components or flat panels, among others, as shown in FIGS. 6A, 6B, 7, 8A, and 8B.

Figure 9A:
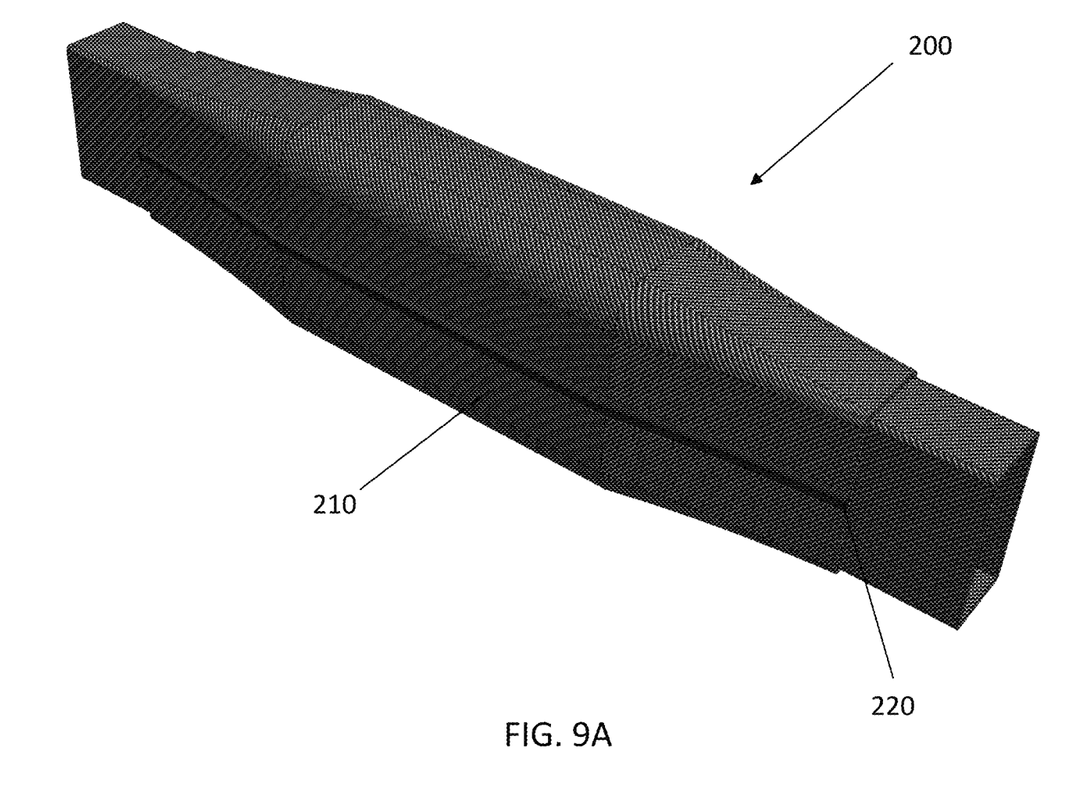
FIG. 9A is a perspective view of another alternate form of a structural joint having a secondary joint cover body and constructed according to the teachings of the present disclosure.
Figure 9B:
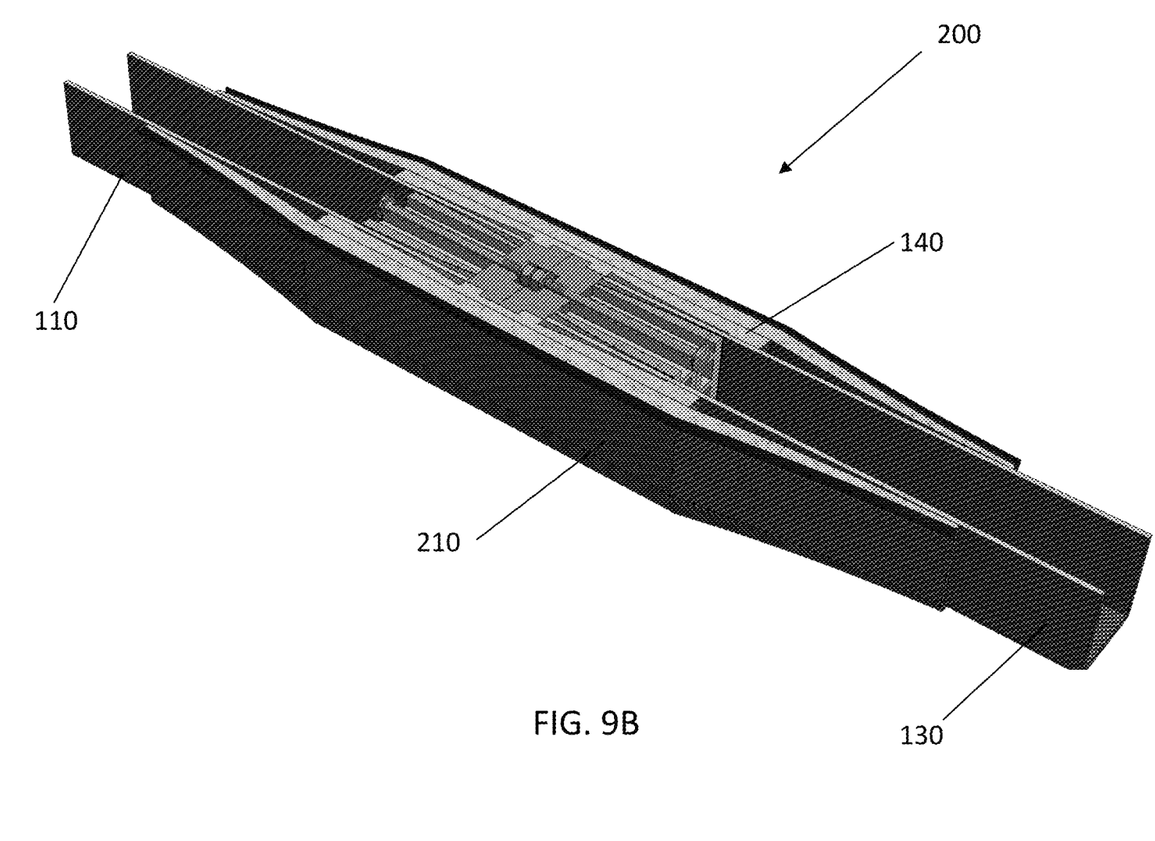
FIG. 9B is a cross-sectional view of the structural joint of FIG. 9A.

As another example of a modification, and with reference to FIGS. 9A and 9B, another structural joint is illustrated and generally indicated by reference numeral 200. This structural joint 200 includes elements as previously described and also includes a secondary joint cover body 210. The secondary joint cover body 210 covers the joint cover body 140 as previously described and may be molded over the structural joint 200 as previously described with reference to FIG. 1 above, or otherwise secondarily secured around the joint cover body 140. The secondary joint cover body 210 may have any of a variety of shapes, including the rectangular shape tapering into the first structural member 110 and the second structural member 130 as shown for improved load transfer. And similar to the form shown above in FIG. 1, the secondary joint cover body 210 may optionally include a boss or recess 220 for ease of removal. In operation, the secondary joint cover body 210 provides additional strength to the structural joint 200, while also providing an alternate exterior profile for increased bending stiffness, among other structural and nonstructural functionality.

These and further modifications as well as any replacement by technical equivalents may be added to the description and figures, without leaving the scope of the protection of the disclosure and of the present patent.

What is claimed is:

1. A structural joint comprising:
a first compression element defining an exterior profile geometry, the exterior profile geometry configured to accommodate a set of loading conditions;
a first structural member having a distal end portion disposed adjacent the first compression element and defining a first gap therebetween;
a first adhesive material covering the external profile geometry of the first compression element and filling the first gap between the first structural member and the first compression element;
a second compression element defining an exterior profile geometry, the external exterior profile configured to accommodate the set of loading conditions;
a second structural member having a distal end portion disposed adjacent the second compression element and defining a second gap therebetween;
a second adhesive material covering the external profile geometry of the second compression element and filling the second gap between the second structural member and the second compression element;
a joint cover body extending over the distal end portions of the structural members and defining laterally opposed internal pockets, the laterally opposed internal pockets defining a profile geometry, the profile geometry configured to accommodate the set of loading conditions; and
a tertiary adhesive disposed within the laterally opposed internal pockets of the joint cover body,
wherein the exterior profile geometry of the first compression element and the second compression element tapers inwardly toward the distal end portions of the first structural element and the second structural element, respectively.

2. The structural joint according to claim 1, wherein at least one of the first structural member and the second structural member are hollow.

3. The structural joint according to claim 2, wherein at least one of the first structural member and the second structural member define a closed geometry.

4. The structural joint according to claim 1 further including a locking system comprising:
a first central compression cap disposed adjacent a distal end portion of the first compression element and secured to an interior portion of the joint cover body;
a second central compression cap disposed adjacent a distal end portion of the second compression element and secured to the interior portion of the joint cover body;
a first securing device adapted to secure the first compression element to the first central compression cap; and
a second securing device adapted to secure the second compression element to the second central compression cap
wherein the locking system is configured to hold the first and second compression units under compressive loads.

5. The structural joint according to claim 4, wherein:
the first and second securing devices each comprise an elongated bolt having a head at a proximal end portion and threads at a distal end portion, and a nut secured to the threads;
the first and second central compression caps each define a recessed portion to receive the nuts; and each of the heads of the first and second elongated bolts abut proximal end portions of each of the first and second compression elements.

6. The structural joint according to claim 4, wherein the joint cover body defines an internal cavity adapted to receive extensions on outer portions of the first and second central compression caps.

7. The structural joint according to claim 1, wherein at least one of the first structural member and the second structural member comprise at least one internal stiffener.

8. The structural joint according to claim 1, wherein the first, second, and tertiary adhesive materials are the same material.

9. The structural joint according to claim 8, wherein at least one of the first, second, and tertiary adhesive materials are selected from the group consisting of epoxies, cyanoacrylates, urethanes, and acrylics.

10. The structural joint according to claim 1, wherein normal compressive forces from the structural joint under loads are equalized across each of the adhesive materials.

11. The structural joint according to claim 1 further comprising at least one removable band extending around the joint cover body.

12. The structural joint according to claim 1, wherein at least one of the first structural member and the second structural member define a composite material.

13. The structural joint according to claim 1, wherein the joint cover body defines a tapered outer profile that extends inwardly from a central portion of the structural joint distally.

14. The structural joint according to claim 13, wherein the tapered outer profile defines a two-dimensional taper.

15. The structural joint according to claim 13, wherein the tapered outer profile defines a three-dimensional B-surface.

16. The structural joint according to claim 1, wherein the laterally opposed internal pockets are tapered inwardly from a center portion thereof outwardly.

17. The structural joint according to claim 1, wherein:
the gap between the first structural member and the first compression element is wider at the distal end portion of the first structural member and tapers inwardly towards a proximal end portion of the first structural member; and
the gap between the second structural member and the second compression element is wider at the distal end portion of the second structural member and tapers inwardly towards a proximal end portion of the second structural member.

18. The structural joint according to claim 1, wherein at least one of the first compression element and the second compression element define internal longitudinal cutouts.

19. The structural joint according to claim 1, wherein the first compression element is symmetrical with the second compression element.

20. The structural joint according to claim 1 further comprising a secondary joint cover body.

21. A structural joint comprising:
a first compression element defining an exterior profile geometry, the exterior profile geometry configured to accommodate a set of loading conditions;
a first structural member having a distal end portion disposed adjacent the first compression element and defining a first gap therebetween;
a first adhesive material covering the external profile geometry of the first compression element and filling the first gap between the first structural member and the first compression element;
a second compression element defining an exterior profile geometry, the external exterior profile configured to accommodate the set of loading conditions;
a second structural member having a distal end portion disposed adjacent the second compression element and defining a second gap therebetween;
a second adhesive material covering the external profile geometry of the second compression element and filling the second gap between the second structural member and the second compression element;
a joint cover body extending over the distal end portions of the structural members and defining laterally opposed internal pockets, the laterally opposed internal pockets defining a profile geometry, the profile geometry configured to accommodate the set of loading conditions; and
a tertiary adhesive disposed within the laterally opposed internal pockets of the joint cover body,
wherein:
the gap between the first structural member and the first compression element is wider at the distal end portion of the first structural member and tapers inwardly towards a proximal end portion of the first structural member; and
the gap between the second structural member and the second compression element is wider at the distal end portion of the second structural member and tapers inwardly towards a proximal end portion of the second structural member.

* * * * *